United States Patent
Ikeda et al.

[11] Patent Number: 5,216,248
[45] Date of Patent: Jun. 1, 1993

[54] PHOTODETECTOR WITH MASK FOR STABLE OUTPUT SIGNAL

[75] Inventors: Shinyu Ikeda; Taizo Saito; Yoshiyuki Araki, all of Tokyo, Japan

[73] Assignee: Asahi Kogaku Kogyo Kabushiki Kaisha, Tokyo, Japan

[21] Appl. No.: 787,216

[22] Filed: Nov. 4, 1991

[30] Foreign Application Priority Data

Nov. 8, 1990 [JP] Japan .............................. 2-117848[U]

[51] Int. Cl.$^5$ .............................................. H01J 3/14
[52] U.S. Cl. ................................ 250/237 R; 250/214.1
[58] Field of Search .................... 250/235, 236, 237 R, 250/211 R, 211 J, 216; 358/494

[56] References Cited

U.S. PATENT DOCUMENTS

| | | | |
|---|---|---|---|
| 3,179,808 | 4/1965 | Grey et al. | 250/237 R |
| 3,237,012 | 2/1966 | Treffeisen | 250/236 |
| 4,663,524 | 5/1987 | Gale et al. | 250/237 R |
| 4,746,793 | 5/1988 | Hopkins | 250/237 R |
| 4,847,492 | 7/1989 | Houki | 250/235 |
| 4,850,692 | 7/1989 | Hirao et al. | 250/237 R |
| 5,065,015 | 11/1991 | Horiguchi et al. | 250/237 R |

FOREIGN PATENT DOCUMENTS

| | | |
|---|---|---|
| 58-106952 | 6/1983 | Japan . |
| 58-127108 | 7/1983 | Japan . |
| 60-76867 | 5/1985 | Japan . |

Primary Examiner—David C. Nelms
Attorney, Agent, or Firm—Sandler Greenblum & Bernstein

[57] ABSTRACT

A photodetector, for use as a scanning light beam detector in an optical scanner, has a light-detecting element having a light-detecting surface for detecting a scanning light beam. The photodetector has a slit film which has a light-transmissive section for allowing light to be applied to the light-detecting surface and a light-blocking section for blocking light from the light-detecting surface. The slit film is disposed directly on the light-detecting surface. The slit film is evaporated or printed directly on the light-detecting surface. Therefore, the scanning light beam is applied to a desired light-incident area of the light-detecting surface which is positioned and dimensioned with high accuracy. The slit film needs no complex procedure for fine positional adjustment as it is fixedly positioned with respect to the light-detecting element.

8 Claims, 6 Drawing Sheets

PHOTODETECTOR WITH MASK FOR STABLE OUTPUT SIGNAL

The present disclosure relates to subject matter contained in Japanese utility model application No. 2-117848 (filed on Nov. 8, 1990) which is expressly incorporated herein by reference in its entirety.

BACKGROUND OF THE INVENTION

1. Field of the Invention:

The present invention relates to a photodetector for detecting a scanning light beam in an optical scanner to detect the time to write information on a latent image carrier in a laser printer.

2. Description of the Relevant Art:

Generally, in laser printers, a scanning light beam that periodically sweeps in a main scanning direction is produced by a light beam scanning device and applied to a latent image carrier while the latent image carrier is being rotated in an auxiliary scanning direction, thereby forming a latent image two-dimensionally on the latent image carrier.

The light beam scanning device has a light deflector, such as a polygon mirror, for deflecting a light beam, which is emitted by a light source, in the main scanning direction. The scanning light beam thus produced is then applied to the latent image carrier. The scanning light beam starts being applied to the latent image carrier in timed relation to the detection, by a light beam detector of the scanning light beam, immediately prior to a scanning stroke thereof.

The light beam detector comprises a light-detecting element having a light-detecting surface directed toward the scanning light beam. The light-detecting element is electrically connected to an electric circuit in the light beam scanning device. In synchronism with the detection, by the light-detecting element, of the scanning light beam, the electric circuit in the light beam scanning device produces a horizontal scanning signal. Then, the light source of the optical scanner starts to apply a scanning light beam, which is modulated with the information of an image or the like to be printed, to the latent image carrier.

Therefore, the position where the desired information starts being written on the latent image carrier is determined by the exact time at which the horizontal synchronizing signal is produced.

Heretofore, it has been customary to cover the light-detecting element with a slit member that has a light-transmissive section and a light-blocking section, and attach the slit member to a baseboard on which the light-detecting element is mounted. With the light-transmissive section positioned over the light-detecting surface of the light-detecting element, the scanning light beam falls on only the stable-sensitivity area of the light-detecting surface.

Since the slit member is a separate member, however, the number of components of the light beam detector is relatively large. In order to direct the scanning light beam accurately to the stable-sensitivity area of the light-detecting surface, the slit member has to be secured to the baseboard with high positional accuracy. Consequently, the procedure for attaching the slit member to the baseboard with positional accuracy with respect to the light-detecting element has been cumbersome.

The dimensional accuracy of the width of the light-transmissive section of the light-detecting surface along the main scanning direction directly affects the duration of the output signal from the light-detecting element. Inasmuch as the slit member is generally molded of synthetic resin, it is difficult to increase the dimensional accuracy of the width of the light-transmissive section. Therefore, the duration of a pulse signal which is produced by comparing the output signal from the light-detecting element with a threshold signal tends to be unstable, adversely affecting the accuracy of the position where the desired information to be printed is written on the latent image carrier.

SUMMARY OF THE INVENTION

In view of the aforesaid drawbacks of the conventional photodetectors, it is an object of the present invention to provide a photodetector which allows a light-incident area to be established with respect to a light-detecting surface of a light-detecting element without increasing the number of components used. Further, the invention permits the light-incident area to be dimensioned accurately, and does not require a complex procedure to position the light-incident area with high accuracy with respect to the light-detecting surface.

To achieve the above object, there is provided in accordance with the present invention, a photodetector comprising a light-detecting element having a light-detecting surface for detecting light, a mask having a light-transmissive section for allowing light to be applied to the light-detecting surface, and a light-blocking section for blocking light from the light-detecting surface. The mask is disposed directly on the light-detecting surface.

The light is applied to the light-detecting surface through the mask that is fixedly positioned with respect to the light-detecting element. With the mask, no separate member is required to define a light-incident area where the light is applied to the light detecting surface. Thus, the light-incident area can be positioned with high accuracy.

The mask comprises a film formed on the light-detecting surface by evaporation (i.e., deposition) or printing. Therefore, the light-incident area to which the light is applied can be dimensioned by the mask with higher accuracy than if the light-incident area were defined by a member molded of synthetic resin. As a result, the dimensions of the light-incident area are rendered accurate.

Since the mask is fixedly positioned with respect to the light-detecting surface of the light-detecting element, no fine adjustment for positioning the mask with respect to the light-detecting surface is required. Consequently, no complex procedure for such fine positional adjustment is necessary.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
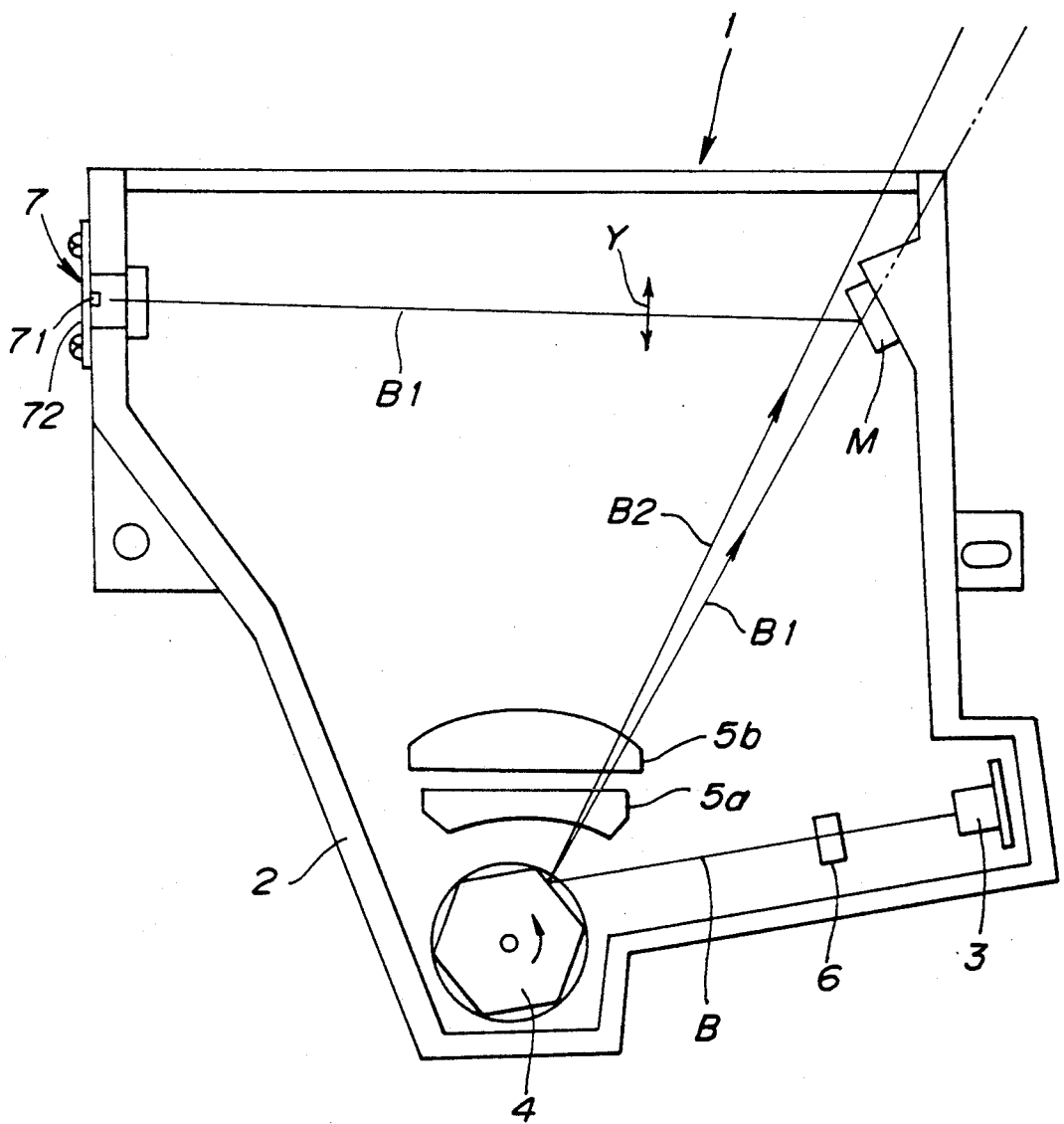
FIG. 1 is a view showing a layout of parts in the housing of an optical scanner which incorporates a photodetector according to the present invention.

Like or corresponding parts are denoted by like or corresponding reference characters throughout the views.

The principles of the present invention are particularly useful when embodied in a photodetector for use as a scanning light beam detector in an optical scanner.

For a more comprehensive understanding of the present invention, optical scanners incorporating a photodetector according to the present invention will briefly be described below.

FIG. 1 shows a layout of various parts in a housing 2 of an optical scanner 1.

The housing 2 accommodates therein a light source 3 for generating a light beam B bearing optical information, a light deflector 4 for deflecting the light beam B as scanning light beams B1, B2 and a pair of $f\theta$ lenses 5a, 5b for causing the scanning light beams B1, B2 to sweep at a constant velocity and focusing the scanning light beam B2 onto a photosensitive drum or the like (not shown) as a latent image carrier. The housing 2 further accommodates a correcting lens 6 disposed on the path of the light beam B from the light source 3 to the light deflector 4, and a reflecting mirror M for reflecting the scanning light beam B1 to a scanning light beam detector 71 of a synchronizing signal detecting device 7 at a starting end of each scanning cycle.

The synchronizing detecting device 7, which is mounted on the housing 2, serves to detect the scanning light beam B1, reflected by the reflecting mirror M, thereby producing a horizontal scanning signal to determine a position where to start writing information on the latent image carrier in each scanning cycle.

Figure 2:
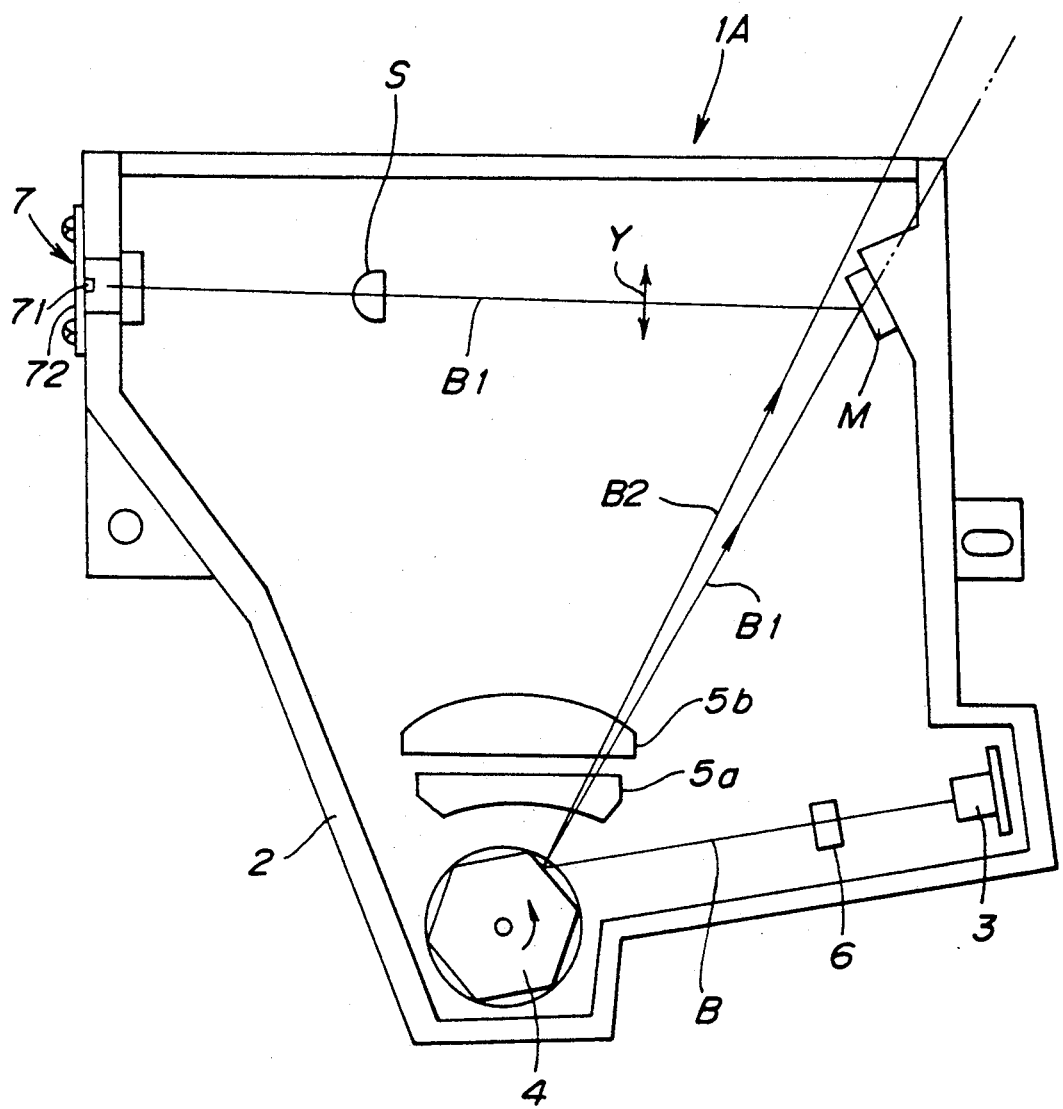
FIG. 2 is a view showing a layout of parts in the housing of another optical scanner which incorporates a photodetector according to the present invention.

FIG. 2 of the accompanying drawings shows another optical scanner 1A that is basically the same as the optical scanner 1 shown in FIG. 1 except that a cylindrical lens S is positioned between the reflecting mirror M and the scanning light beam detector 71. The cylindrical lens S serves to correct a deviation, in the direction indicated by the arrow Y, of the reflected scanning light beam B1 due to a positional error of the reflecting mirror M with respect to the housing 2, i.e., a deviation of the reflected scanning light beam B1 in its scanning direction, so that the corrected scanning light beam B1 will be applied to the scanning light beam detector 71.

As shown in FIGS. 1 and 2, each of the scanning light beam detecting devices 7 in the optical scanners 1, 1A comprises the scanning light beam detector 71 for detecting the scanning light beam B1 reflected by the reflecting mirror M. A circuit 72 is provided for supplying the generated horizontal scanning signal to a controller (not shown) of the light source 3.

When the scanning light beam B1 is applied to the scanning light beam detector 71, the scanning light beam detector 71 produces an output signal having a level indicative of the detected intensity of the scanning light beam B1. When the level of the output signal continuously exceeds a predetermined level for a predetermined period of time, the circuit 72 produces a horizontal synchronizing signal. A predetermined period of time after the horizontal synchronizing signal is applied to the controller of the light source 3, the light source 3 is energized to apply the scanning light beam B2 to the latent image carrier to start writing desired information thereon.

A scanning light beam detector 10 according to a first embodiment of the present invention will be described with reference to FIGS. 3 through 7. The scanning light beam detector 10, which may be used as the scanning light beam detector 71, as shown in FIGS. 1 and 2, may employ a cadmium cell, for example, as a light-detecting element. The scanning light beam detector 10 serves to detect a scanning light beam 17 that sweeps in the main scanning direction indicated by the arrow A. The scanning light beam 17 corresponds to the scanning light beam B1 shown in FIGS. 1 and 2.

Figure 4:
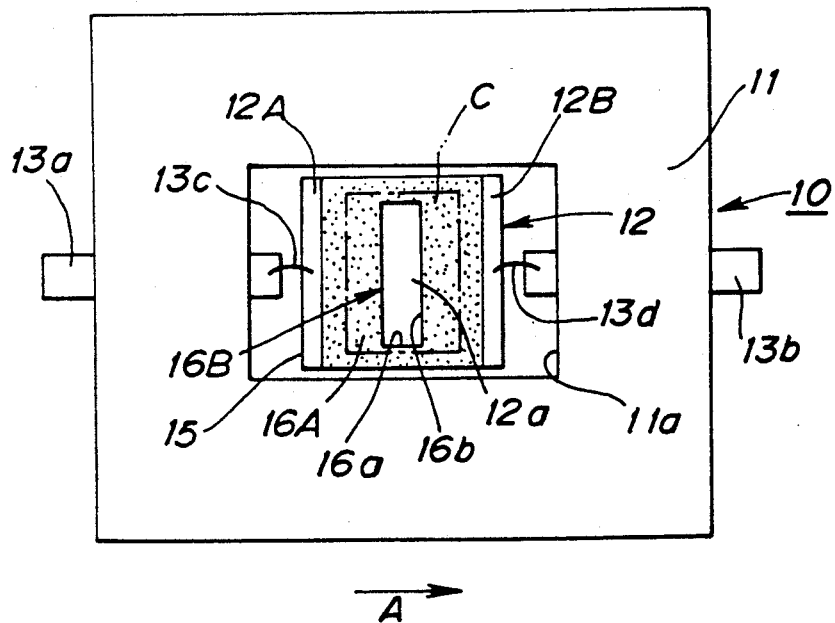
FIG. 4 is a plan view of the photodetector shown in FIG. 3, with a transparent sealing member removed therefrom.

The scanning light beam detector 10 comprises a baseboard 11 made of ceramic or the like, a light-detecting element 12 bonded to the bottom of a cavity 11a defined in a surface of the baseboard 11, and a light-detecting element 12 having signal output terminals 12A, 12B (see FIG. 4). The scanning light beam dector 10 further comprises a pair of lead terminals 13a, 13b electrically connected to the respective signal output terminals 12A, 12B through respective bonding wires 13c, 13d and extending through and projecting out of the baseboard 11, and a transparent sealing member 14 attached to the surface of the baseboard 11 in which the cavity 11a is defined, sealing the light-detecting element 12 within the cavity 11a. The transparent sealing member 14 may be formed from glass or plastic, for example. The baseboard 11 and the transparent sealing member 14 jointly constitute a package that houses the light-detecting element 12.

When the light-detecting element 12 detects the scanning light beam 17, the light-detecting element 12 produces an output signal whose level is commensurate with the detected intensity of the scanning light beam 17, and supplies the produced output signal through the signal output terminals 12A, 12B.

The light-detecting element 12 has an upper light-detecting surface 12a facing the transparent sealing member 14. As shown in FIG. 4, the light detecting surface 12a has a central area C, shown as surrounded by a dot-and-dash line, where the sensitivity to light is constant.

Figure 5:
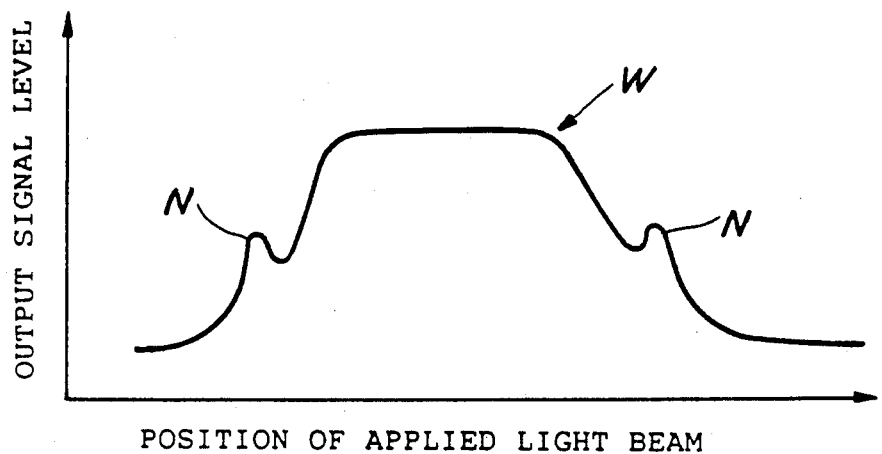
FIG. 5 is a diagram showing the waveform of an output signal produced by a light-detecting element of the photodetector shown in FIG. 3, with no mask provided.

If the scanning light beam 17 were applied directly to the light-detecting surface 12a, the light-detecting element 12 would produce an output signal having a waveform W which would have distortions N at its positive and negative-going edges, i.e., which would not have smooth steep positive and negative-going edges, as shown in FIG. 5.

Figure 3:
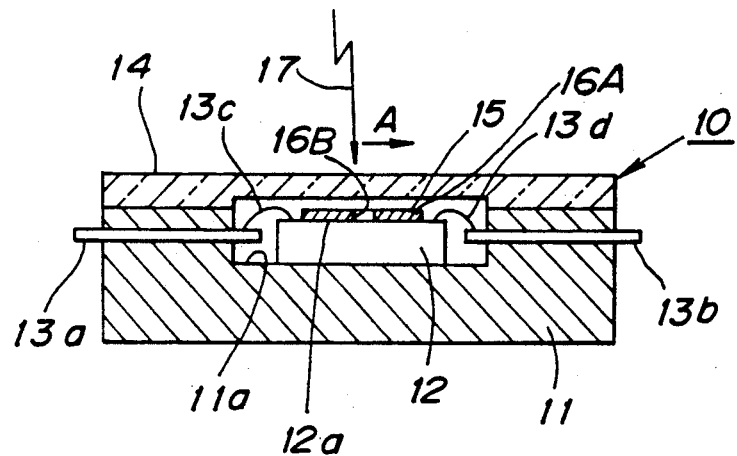
FIG. 3 is a cross sectional view of a photodetector according to a first embodiment of the present invention.

According to the present invention, as shown in FIG. 3, a slit film 15, serving as a mask, is directly disposed on the light-detecting surface 12a.

In the light detecting element 12, in the first embodiment, only the upper light-detecting surface 12a is sensitive to light, and other side surfaces are not sensitive to light.

The slit film 15 is made of aluminum or the like, which is formed on the light-detecting surface 12a as by evaporation, printing, or the like. The slit film 15 serves to limit the scanning light beam 17 to the area C where light sensitivity is constant. The slit film 15 has a light-blocking section 16A for blocking the scanning light beam 17, and a slit 16B as a light-transmissive section for transmitting the scanning light beam 17 therethrough to a region within the constant-sensitivity area C of the light-detecting surface 12a. In the illustrated example, the position of the light-transmissive section is selected such that the light-receiving region of the surface 12a is defined at the central portion of the area C. However, the light-receiving region is not limited to the central portion of the area C, but may be defined at any place on the surface 12a provided it is confined within the area C.

As shown in FIG. 4, the slit 16B is of a size smaller than the constant-sensitivity area C, and is of a rectangular shape having a shorter side 16a extending in the main scanning direction indicated by the arrow A, and a longer side 16b extending perpendicularly to the main scanning direction A.

When the scanning light beam 17, that sweeps in the main scanning direction A, is applied through the transparent sealing member 14, only the scanning light beam 17 that has passed through the slit 16B reaches the light-detecting surface 12a.

Figure 6:
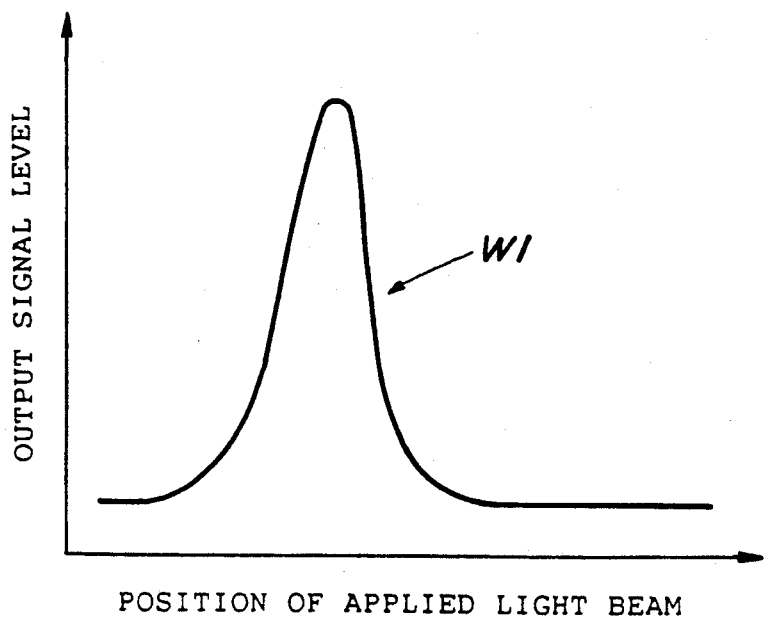
FIG. 6 is a diagram showing the waveform of an output signal produced by the light-detecting element of the photodetector shown in FIG. 3, with a mask provided.
Figure 7:
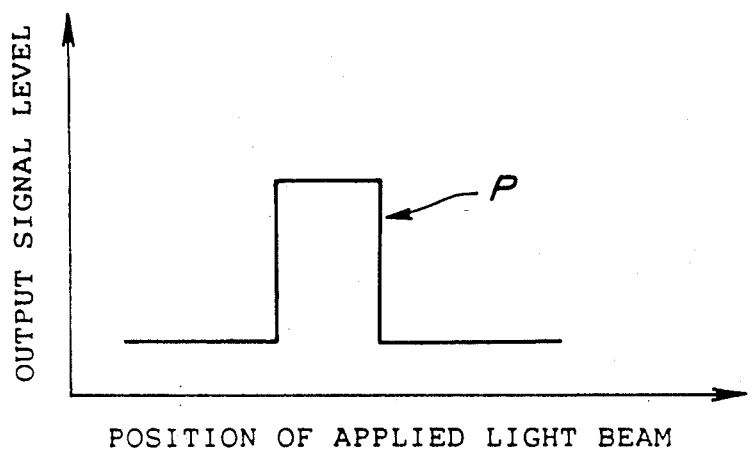
FIG. 7 is a diagram showing the waveform of a pulse signal produced by comparing the output signal shown in FIG. 6 with a threshold level.

At this time, the scanning light beam detector 10 produces an output signal having an waveform W1, as shown in FIG. 6, and supplies the output signal through the lead terminals 13a, 13b. As shown in FIG. 6, the waveform W1 has smooth, steep positive and negative-going edges. A pulse signal P (see FIG. 7) which is produced by comparing the output signal, as shown in FIG. 6, with a threshold level has stable-timing positive- and negative-going edges. Therefore, the scanning light beam detector 10 generates a stable output signal waveform when it detects the scanning light beam 17. Accordingly, the position, where desired information starts to be written on the photosensitive drum, (not shown) is established with high accuracy.

Since the slit film 15 is directly formed on the light-detecting surface 12a, the relative position of the slit 16B, with respect to the light-detecting surface 12a, is fixed, requiring no fine adjustment. Therefore, a light-incident area where the scanning light beam 17 is applied to the light-detecting surface 12a, can accurately be established within the stable-sensitivity area C of the light-detecting surface 12a.

Inasmuch as the slit film 15 is formed on the light-detecting surface 12a, as by evaporation or printing, the dimensional accuracy of the slit 16B, and hence the dimensional accuracy of the light-incident area where the scanning light beam 17 is applied to the light-detecting surface 12a, are much higher than would be if the light-incident area were defined by a slit in a slit member molded of synthetic resin. Therefore, the light-incident area has dimensions that are accurate enough to keep the pulse duration of the waveform W1 constant.

While the light-detecting element 12 is housed in the package composed of the baseboard 11 and the transparent sealing member 14 in the first embodiment, the advantages referred to above according to the above embodiment are still offered even if the transparent sealing member 14 is dispensed with.

In the first embodiment, the light-detecting element comprises a cadmium cell having an upper light-detecting surface. In the case where the light-detecting element comprises a photodiode, it is sensitive to light at the side surfaces as well as the upper surface.

Figure 8:
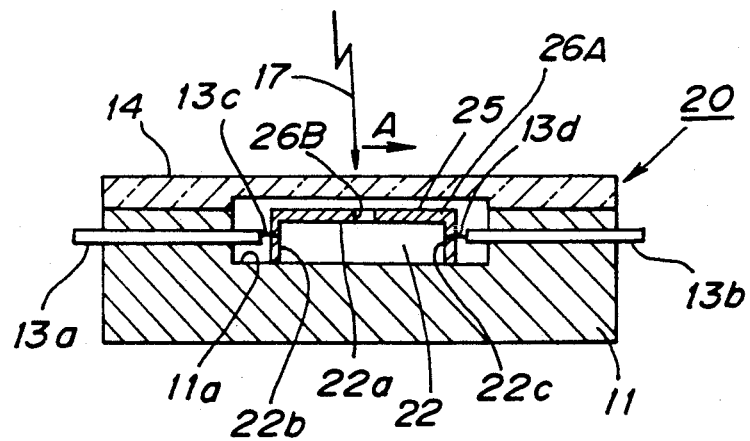
FIG. 8 is a cross-sectional view of a photodetector according to a second embodiment of the present invention.
Figure 9:
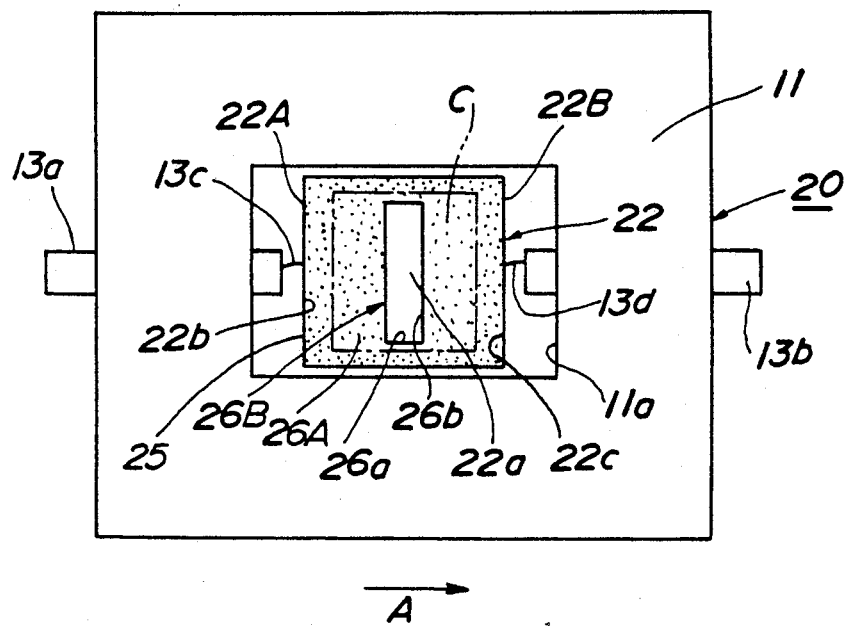
FIG. 9 is a plan view of the photodetector shown in FIG. 8, with a transparent sealing member removed therefrom.

FIGS. 8 and 9 show a scanning light beam detector 20 according to a second embodiment of the present invention. The scanning light beam detector 20 has a photodetector 22 comprising a photodiode. The scanning light beam detector 20 includes a package substantially identical to the package according to the first embodiment. The light-detecting element 22 has signal output terminals 22A, 22B connected to the lead terminals 13a, 13b, respectively, through the respective bonding wires 13c, 13d.

The light-detecting element 22 has an upper light-detecting surface 22a. The light-detecting surface 22a has a central area C where the sensitivity to light is constant. The light detecting element 22 also has side light-detecting surfaces 22b, 22c. A portion of the area C, the entire area surrounding the area C, and the entire areas 22b, 22c are covered with a slit film 25, serving as a mask. The slit film 25 has a light blocking section 26A for blocking the scanning light beam 17, and a slit 26B for transmitting the scanning light beam 17 to the light-detecting surface 22a of the light-detecting element 22. The slit 26B has a shorter side 26a and a longer side 26b (see FIG. 9).

With the second embodiment, even when the scanning light beam 17 is reflected by the lead terminals 13a, 13b and the bonding wires 13c, 13d within the cavity 11a, the reflected light is blocked by the light-blocking section 26A of the slit film 25 and is not applied to the side light-detecting surfaces 22b, 22c. Accordingly, the waveform of the output signal supplied through the lead terminals 13a, 13b is free from distortions (like the distortions N shown in FIG. 5). The scanning light beam detector 20, according to the second embodiment, is thus capable of producing a stable output signal waveform, as with the first embodiment.

In the first and second embodiments, the shorter sides 16a, 26a of the slits 16B, 26B of the slit films 15, 25 extend along the main scanning direction A, and the longer sides 16b, 26b extend perpendicularly to the main scanning direction A. Accordingly, any deviation, in a direction normal to the direction Y in FIG. 2, (i.e.), in a direction normal to the sheet or plane of FIG. 2, of the scanning light beam B1 reflected by the reflecting mirror M in the optical scanners 1, 1A, as shown in FIGS. 1 and 2, (i.e.), any deviation of the scanning light beam B1 in a direction normal to the main scanning direction A, can be absorbed within the range defined by the longer sides 16b, 26b of the slits 16B, 26B. The cylindrical lens S, as shown in FIG. 2, may thus be dispensed with.

Figure 10:
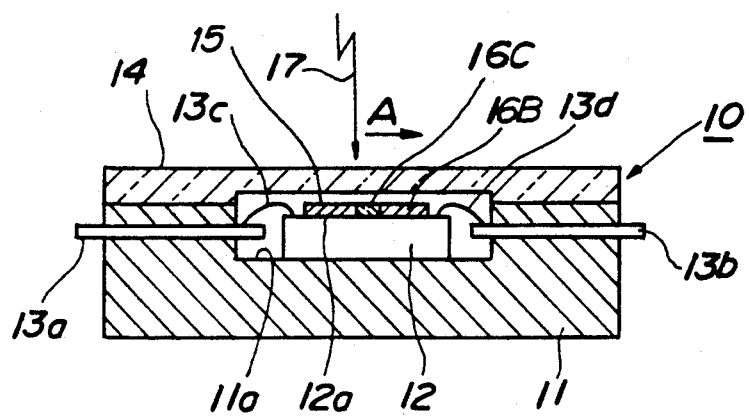
FIG. 10 is a cross-sectional view of a modification of the photodetector according to the first embodiment.

Rather than the slit 16B, defined in the slit film 15 of the scanning light beam detector 10, as shown in FIGS. 3 and 4, a transparent light-transmissive member 16C may be provided as a window in the film 15, as shown in FIG. 10. The light-transmissive member 16C has a shorter side 16a and a longer side 16b.

The scanning light beam detectors 10, 20 according to the first and second embodiments, as shown in FIGS. 3, 4, 8, 9, and the modification, as shown in FIG. 10, are capable of producing a stable output signal waveform when they detect the scanning light beam 17. In the case where these scanning light beam detectors 10, 20 are incorporated as the scanning light beam detector 71 in the optical scanner 1, as shown in FIG. 1, they detect the scanning light beam B1 reflected by the reflecting mirror M for thereby detecting, with a high degree of accuracy the position to start writing desired information on the photosensitive drum.

Although certain preferred embodiments of the present invention have been shown and described in detail, it should be understood that various changes and modifications may be made therein without departing from the scope of the appended claims.

What is claimed is:

1. A photodetector comprising:
   a light-detecting element having a light-detecting surface for detecting light;
   a mask having a light transmissive section for allowing light to be applied to said light-detecting surface and a light blocking section for blocking light from said light-detecting surface; and said mask being disposed directly on said light-detecting surface, wherein said mask comprises a film, said film being evaporated on said light-detecting element.

2. A photodetector according to claim 1, further comprising housing means for housing said light detecting element, said housing means including a transparent member facing said light-detecting surface.

3. A photodetector according to claim 2, wherein said housing means includes a baseboard having a cavity, said light-detecting element being disposed in said cavity.

4. A photodetector according to claim 3, wherein said light-detecting element has output terminals for supplying an output signal having a level commensurate with the intensity of the detected light, further including lead terminals electrically connected to said output terminals and projecting out of said housing means.

5. A photodetector according to claim 1, wherein the light detected by said light-detecting surface is a scanning light beam sweeping in a predetermined direction.

6. A photodetector according to claim 5, wherein said light-transmissive section has a first side extending in said predetermined direction and a second side perpendicular to said predetermined direction, said second side being longer than said first side.

7. A photodetector according to claim 1, wherein said light-transmissive section is in the form of a slit.

8. A photodetector according to claim 1, said light-transmissive section comprises a light-transmissive window.

* * * * *

UNITED STATES PATENT AND TRADEMARK OFFICE
CERTIFICATE OF CORRECTION

PATENT NO. : 5,216,248
DATED : June 1, 1993
INVENTOR(S) : Shinyu IKEDA et al.

It is certified that error appears in the above-indentified patent and that said Letters Patent is hereby corrected as shown below:

At column 7, line 29 (claim 1, line 4) change "light transmissive" to ---light-transmissive---.

At column 8, line 29 (claim 8, line 1) insert ---wherein--- before "said".

Signed and Sealed this

Twenty-ninth Day of August, 1995

Attest:

BRUCE LEHMAN

*Attesting Officer*     *Commissioner of Patents and Trademarks*